US012806873B2

(12) United States Patent
Drammeh et al.

(10) Patent No.: US 12,806,873 B2
(45) Date of Patent: Nov. 24, 2026

(54) PROCESS FOR MANUFACTURING AN OPTICAL ARTICLE HAVING MICROSTRUCTURES, MICROSTRUCTURED OPTICAL ARTICLE AND THEIR USE FOR MYOPIA CONTROL AND/OR PREVENTION

(71) Applicant: Essilor International, Charenton-le-Pont (FR)

(72) Inventors: Ahmed Drammeh, Arlington, MA (US); Hao-Wen Chiu, Holden, MA (US)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 18/716,685

(22) PCT Filed: Dec. 8, 2022

(86) PCT No.: PCT/EP2022/085014
§ 371 (c)(1),
(2) Date: Jun. 5, 2024

(87) PCT Pub. No.: WO2023/104977
PCT Pub. Date: Jun. 15, 2023

(65) Prior Publication Data

US 2025/0312982 A1 Oct. 9, 2025

(30) Foreign Application Priority Data

Dec. 10, 2021 (EP) ..................................... 21306744

(51) Int. Cl.
*B29D 11/00* (2006.01)
*B29L 11/00* (2006.01)
*G02C 7/02* (2006.01)

(52) U.S. Cl.
CPC .. *B29D 11/00326* (2013.01); *B29D 11/00432* (2013.01); *B29D 11/00538* (2013.01);
(Continued)

(58) Field of Classification Search
CPC .................... B29D 11/00326; B29D 11/00432
See application file for complete search history.

(56) References Cited

U.S. PATENT DOCUMENTS 2,833,680 A * 5/1958 Kneeling ........... B29D 11/0073 156/321
2009/0085235 A1 4/2009 Burkle et al.
(Continued)

FOREIGN PATENT DOCUMENTS

CN 101489757 A * 7/2009 ............. B29C 48/07
CN 112390538 A 2/2021
(Continued)

OTHER PUBLICATIONS

Machine translation JP2009181056A (Year: 2009).*
(Continued)

*Primary Examiner* — Abbas Rashid
*Assistant Examiner* — Wayne K. Swier
(74) *Attorney, Agent, or Firm* — Norton Rose Fulbright US LLP

(57) ABSTRACT

The invention relates to a process for manufacturing an optical article comprising at least the following successive steps: (a) producing a first optical functional element A having a first refractive index, named hereafter nA, by injecting in a mold of an injection molding device at least a first material A1, the first optical functional element A having at least a first main face and a second main face, said first main face including a pattern of optical microstructures, (b) coating directly onto said first main face of the first optical functional element A, a second optical functional
(Continued)

element B via a first main face of said second optical functional element, having a second refractive index, named hereafter nB, that is distinct from nA, by injecting into said mold at least a second material B1, characterized in that before performing the step (b), the process further comprises (a1) drying the first optical functional element A, said drying step is adapted to or configured to obtain a first optical functional element A having a moisture content lower than or equal to 500 PPM. The invention also relates to an optical article obtained according to the above-mentioned process and its use for myopia control and/or prevention.

22 Claims, 3 Drawing Sheets

(52) U.S. Cl.
CPC ...... *G02C 7/022* (2013.01); *B29K 2995/0012* (2013.01); *B29L 2011/0016* (2013.01); *G02C 2202/16* (2013.01); *G02C 2202/24* (2013.01)

(56) References Cited

U.S. PATENT DOCUMENTS

2009/0291206 A1 11/2009 Jiang
2010/0040806 A1* 2/2010 Suzuki ....................... C08J 5/18 428/1.31
2020/0247942 A1 8/2020 Kageyama et al.
2020/0277123 A1* 9/2020 Kimura .................. B65D 81/24
2021/0356763 A1 11/2021 Le Saux et al.

FOREIGN PATENT DOCUMENTS

JP H03109224 A * 5/1991
JP 2003026424 A * 1/2003 ........... C03B 17/062
JP 2009181056 A * 8/2009 ........... G02F 1/1335
JP 4600056 B2 * 12/2010
JP 4809022 B2 * 11/2011 ....... B29D 11/00865
WO WO2021/209556 10/2021

OTHER PUBLICATIONS

Machine translation JPH03109224A (Year: 1991).*
Machine translation JP2003026424A (Year: 2003).*
Machine translation CN101489757A (Year: 2009).*
Machine translation JP4600056B2 (Year: 2010).*
Machine translation JP489022B2 (Year: 2011).*
International Search Report and Written Opinion for Application No. PCT/EP2022/085014, mailed Apr. 11, 2024, 9 pages.

* cited by examiner

PROCESS FOR MANUFACTURING AN OPTICAL ARTICLE HAVING MICROSTRUCTURES, MICROSTRUCTURED OPTICAL ARTICLE AND THEIR USE FOR MYOPIA CONTROL AND/OR PREVENTION

CROSS-REFERENCE TO RELATED APPLICATIONS

This application is a national phase application under 35 U.S.C. 371 of International Application NO PCT/EP2022/085014 filed 8 Dec. 2022, which claims priority to European Patent Application No. 21306744.0 filed 10 Dec. 2021. The entire contents of each of the above-referenced disclosures is specifically incorporated by reference herein without disclaimer.

TECHNICAL FIELD OF THE INVENTION

The invention relates to a process for producing optical articles comprising optical microstructures for correction of aberrant vision. The invention also relates to optical articles, especially optical lenses, such as spectacle lenses and their use for myopia control and/or prevention.

BACKGROUND INFORMATION AND PRIOR ART

Myopia, also known as near-sightedness and short-sightedness, is a condition of the eye where the light that enters the eye is not focused directly on the retina. Instead, the light that enters the eye is focused in front of the retina, causing the image that the individual observes to be in or out of focus depending on a distance of an object from the eye of the individual. For instance, when an object is a distant object, the observed object will be out of focus while, when the object is a near object, the observed object will be in focus.

Though correctable by refractive surgery, myopia is most commonly corrected through the use of corrective optical article, in particular corrective optical lenses, such as spectacle lenses or contact lenses. The corrective optical lenses have a negative optical power (i.e., have a net concave effect), which compensates for the excessive positive diopters of the myopic eye. Negative diopters are generally used to describe a severity of a myopic condition, as this is the value of the lens to correct the vision.

Recently, efforts in addressing the progression of myopia in children and young adults have included providing optical microstructures directly on surfaces of corrective lenses, and in particular directly on surface of corrective lens substrates. The optical microstructures may be microlenses, for instance, that redirect part of the incoming light to the retina. The use of microlenses on the surface of a regular single vision lens to introduce peripheral defocus has been shown to be very effective in slowing the progression of myopia.

Generally, optical microstructures are incorporated according to a predetermined pattern directly on surfaces of the corrective lens substrates. The optical microstructures may be engraved, etched, or embossed directly on either a convex surface of the corrective lens substrate (e.g. a surface of the substrate opposite to the one that is adjacent to an eye of a wearer) or a concave surface of the corrective lens substrate (e.g. a surface of the substrate that is adjacent to an eye of a wearer).

However, this arrangement may lead to scratching or other damage to the optical microstructures as a result of everyday use or as a result of the manufacturing process of the corrective lens substrate.

For instance, during the manufacturing of the corrective lens substrate comprising the optical microstructures, it is usual to coat, additional coatings such as a hard coating onto the substrate surface comprising these optical microstructures. However, this coating step changes the optical microstructure shape and requires therefore several concept loops to reach a design compensation for each kind of additional coating and thus leads to a longer development time and a higher cost.

So as to overcome these drawbacks and especially, to resolve the coating dependence issue, a solution consists in performing injection-molding, especially injection-overmolding, onto the lens substrate surface comprising said optical microstructures.

In particular, the injection molding technology comprises:

- a first step of injecting a first material in a mold having a specific shape (that is to say having a shape that is opposite to the one of the optical microstructures) for forming in general the "thin upper part" of the lens substrate that has on one of its two main faces the predetermined optical microstructures and on the other face, no microstructures (smooth surface),
- a second step of injecting directly onto the microstructured surface of this thin upper part, a second material (different from the first one) forming the "main lower part" of the lens substrate, whose one main surface encapsulates said microstructured surface of the first material and the other main surface has no microstructures (also smooth).

Therefore, the optical article thus formed comprises a substrate having a composite structure (thin upper part/main lower part) that adhered through thermomechanical fusing. Generally, the smooth surface of the thin upper part corresponds to the convex front surface of the lens substrate and the smooth surface of the main lower part corresponds to the concave rear surface of the lens substrate.

This technique enables to produce a corrective optical article, such as an ophthalmic lens wherein the optical microstructures are embedded inside the body of the lens substrate.

In addition, the injection molding technology is commonly the preferred solution for large scale manufacturing of optical microstructure patterns.

However, even during this process, the applicant has found that the overall optical properties, such as the global average power of the microstructures of the optical lenses thus formed drifted from one injection molding run to another run performed during the same run or on a different day. Indeed, it was found by the applicant that the degree of replicability of optical microstructured pattern on a substrate surface can be greatly influenced by the injection molding process, as well as several steps post injection (addition of the hard coating or other functional coatings).

Specifically, the Applicant observed that the high stresses of the molding process naturally would impart some level of built-in residual stress in a molded part. Also, it also noted that post molding phenomenon, such as shrinkage and stress relaxation, should be accounted for in order to generate products with acceptable dimensional fidelity. Indeed, the applicant has observed that during injection molding, high shear and high pressure together with frozen in molecular orientation of polymer chains of the first material led to residual stresses in molded parts. A substrate having residual stresses resulting from the injection molding process that would be exposed to additional processing downstream could undergo dimensional changes when exposed to other stimuli significant enough (such as thermal or chemical shock) to retard the function it was intended to perform.

Hence, an object of the present invention is thus to propose a new method for manufacturing microstructured optical articles obtained by the injection molding technology which, at least, avoids the aforementioned drawbacks.

SUMMARY OF THE INVENTION

For that purpose, the invention therefore relates to a process for manufacturing an optical article comprising at least the following successive steps:

(a) producing a first optical functional element A having a first refractive index, named hereafter $n_A$, by injecting into a mold of an injection molding device at least a first material A1, the first optical functional element A having at least a first main face and a second main face, said first main face including a pattern of optical microstructures, (b) applying directly onto said first main face of the first optical functional element A, a second optical functional element B via a first main face of said second optical functional element, having a second refractive index, named hereafter $n_B$, that is distinct from $n_A$, by injecting into said mold at least a second material B1, so as to form said optical article, characterized in that, before performing the step (b), the process further comprises (a1) drying the first optical functional element A, said drying step is adapted to or configured to obtain the first optical functional element A that has a moisture content lower than or equal to 500 PPM, preferably lower than or equal to 200 PPM.

The invention also deals with an optical article comprising a substrate with a front main face and with a rear main face, said substrate comprises at least:

a first optical functional element A having a first refractive index, named hereafter $n_A$, the first optical functional element A having at least a first main face and a second main face, said first main face including a pattern of optical microstructures, a second optical functional element B having a second refractive index, named hereafter $n_B$, that is distinct from $n_A$, the second optical functional element B having at least a first main face and a second main face, said first main face of the optical second functional element B being in direct contact with the first face including the pattern of optical microstructures of the first optical functional element A, characterized in that the optical first functional element A has a moisture content lower than or equal to 500 PPM, preferably lower than or equal to 200 PPM.

Finally, the invention concerns the use of the optical article such as defined above or obtained according to the aforementioned method, for myopia control and/or prevention.

BRIEF DESCRIPTION OF THE DRAWINGS

The present invention will be described in more detail by referring to the appended drawings, wherein:

FIG. 1 (*b*) is an enlarged view of FIG. 1(*a*) showing the rings (R01 to R11) in a ray (horizontal axis X-X) of the first optical functional element A;

DETAILED DESCRIPTION OF THE INVENTION AND PREFERRED EMBODIMENTS

A) Definitions

Figure 1A:
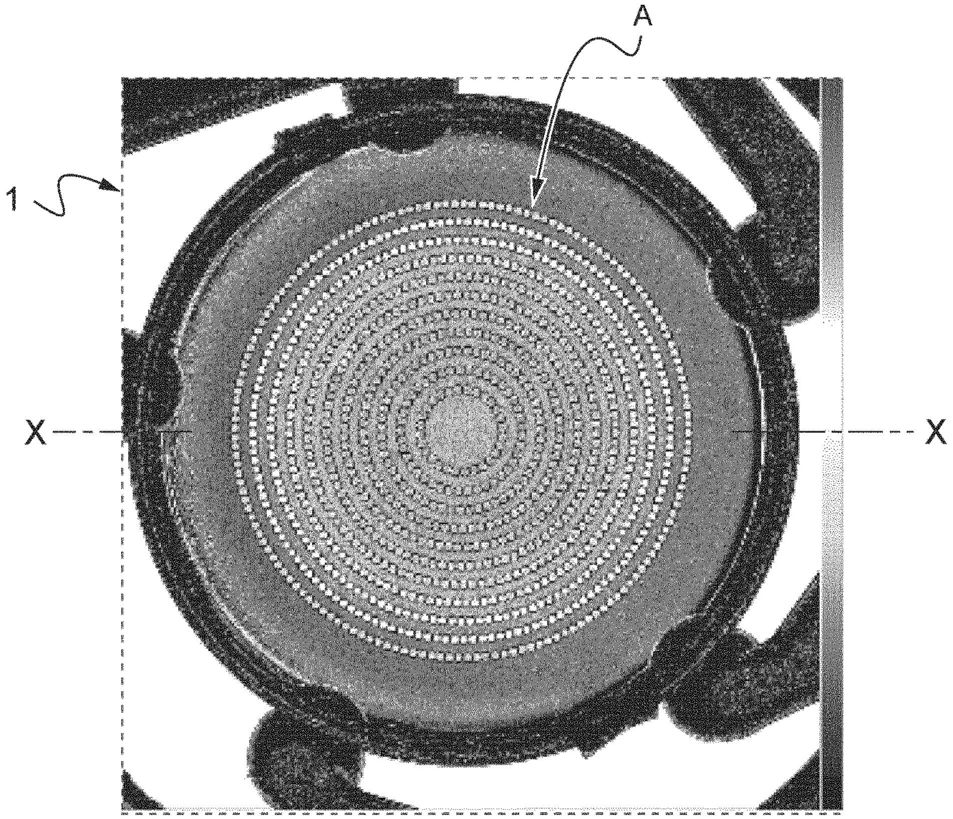
FIG. 1 (*a*) is a top view of one embodiment of the first optical functional element A of an optical article obtained according to the process according to the invention that comprises optical microstructures arrayed in concentric circles which represent rings (R01 to R11)

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, ranges, reaction conditions, etc. used herein are to be understood as modified in all instances by the term "about."

Also, unless otherwise indicated, the indication of an interval of values «from X to Y» or "between X to Y", according to the present invention, means as including the values of X and Y.

In the present application, when an optical lens comprises one or more coatings onto the surface thereof, the expression "to deposit a layer or a coating onto the article" is intended to mean that a layer or a coating is deposited onto the external (exposed) surface of the outer coating of the article, that is to say its coating that is the most distant from the substrate.

Unless otherwise indicated, a coating, that is said to be "on" a substrate or deposited "onto" a substrate is defined as a coating, which (i) is positioned above the substrate, (ii) is not necessarily in contact with the substrate, that is to say one or more intermediate coatings may be arranged between the substrate and the coating in question, and (iii) does not necessarily completely cover the substrate.

In a preferred embodiment, the coating on a substrate or deposited onto a substrate is in direct contact with this substrate.

When "a layer 1 is lying under a layer 2", it is intended to mean that layer 2 is more distant from the substrate than layer 1.

As used herein, a layer of the antireflective coating is defined as having a thickness higher than or equal to 1 nm. Thus, any layer having a thickness lower than 1 nm will not be considered when counting the number of layers in the antireflective coating. A sub-layer such as described hereafter either is not considered when counting the number of layers of the antireflective coating.

According to the invention and unless stated otherwise, all thicknesses disclosed in the present application relate to physical thicknesses.

As used herein, the rear (or the inner) face of the substrate is intended to mean the face which, when using the article, is the nearest from the wearer's eye. It is generally a concave face. On the contrary, the front face of the substrate, is the face which, when using the article, is the most distant from the wearer's eye. It is generally a convex face.

In addition, according to the invention, the "angle of incidence (symbol θ)" is the angle formed by a ray light incident on an optical lens surface and a normal to the surface at the point of incidence.

According to the invention, the moisture content has been determined by using a chemical-free moisture analyer, in particular the Computrac® Vapor Pro® analyzer commercialized by the company Arizona Instrument LLC, Tempe, USA, and in accordance with the standard ASTM D6980 or ISO 15512:2019.

In addition, according to the invention, the "global average power" measures the optical power profile of the microstructures of the optical article. This measure is performed by using an imaging device, such as using Essilor's analytical tool called Jarvis Clear-Reader. In particular, the "global average power" is measured for a given set of microstructures and corresponds to the average of the individual optical powers measured for each microstructure of this set of microstructures. The individual optical power of a microstructure which is measured is dependant both on the intrinsic optical power of the microstructure and on the main optical power of the optical article carrying the microstructures. Hence, the global average power does not correspond to an "average power" of the whole optical article.

For instance and according to an embodiment of the invention, the microstructures are arranged in concentric rings (such as R01 to R11) and the microstructures located into one ring (such as R01) form a set of microstructures such as defined above. In this case, the set of microstructures taken into account for averaging the global power corresponds to all the microstructures located in the same "ring". Generally, the global average power of the set of microstructures of a ring (such as R01) is slightly different from the global average power of the set of microstructures of another ring (such as R02). Accordingly, in this case, and unless mentioned otherwise, the "global average power" of an optical article corresponds to the global average power of the set of microstructures located in each ring and may be called here after "the global average power of a ring". When two articles are compared using the global average optical power, it means that the global average powers of microstructures located into similar rings are compared (such as the average global power of the ring R01 of a lens 1 is compared with the average global power of the ring R01 of another lens).

However, within the spirit of the disclosure, one may measure or validate the effects of the method of the disclosure even on optical articles having microstructures which are not arranged into concentric rings and present a different organisation of microstructures (while being able to vary the global average power). One way to do it would be to measure the global average power of all the microstructures of the optical article, or to compare the global average power of subset of the microstructures of the optical article.

B) Method According to the Invention

The applicant sought to develop a new method for producing optical articles comprising a substrate having a composite structure comprising a thin microstructured upper part formed by injecting a first material and a main lower part formed by injecting (injection overmolding) a second material directly onto the optical microstructures, these two parts adhered to each other through thermomechanical fusing, the new method being suitable to solve the above-mentioned drawbacks of the prior art and is also suitable for forming optical articles for myopia control and/or prevention.

In particular, the Applicant has developed a new method, wherein the degree of replicability (i.e.: dimensional fidelity) of this optical microstructure pattern is good between two consecutive injection molding runs and this, whatever the used materials for forming the upper and lower parts of the substrate.

In fact, the Applicant has developed a new method that enables both to decrease the amount of built-in residual stress within the substrate, while keeping the overall optical properties of the optical microstructures within acceptable ranges in a repeatable and reproducible manner.

The Applicant has thus found a new method that allow to control the consistency and the accuracy of the global average power of the microstructures of these kinds of optical articles comprising a composite structure substrate with a thin microstructured upper part and a main lower part.

Figure 1B:
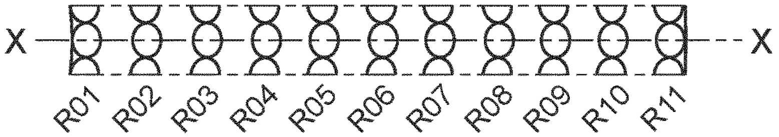
Figure 2:
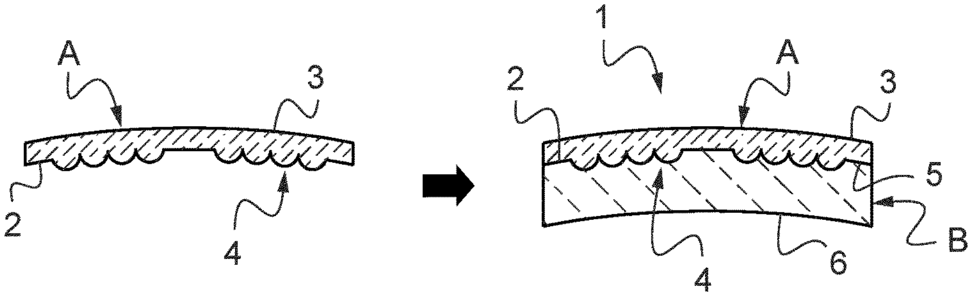
FIG. 2 shows a schematic of an optical article obtained according to an embodiment of the process according to the invention, which consists of an injection of a microstructured first optical functional element A (also named "microstructured upper substrate part"), which is subsequently injection overmolded with a second optical functional element B (also named "main lower substrate part") so as to form an optical article having a composite structure.

For that purpose and by referring to FIGS. 1 and 2, the invention relates to a process for manufacturing an optical article 1 comprises at least the following successive steps:

(a) producing a first optical functional element A having a first refractive index, named hereafter $n_A$, by injecting in a mold of an injection molding device at least a first material A1, the first optical functional element A having at least a first main face 2 and a second main face 3, said first main face 2 including a pattern of optical microstructures 4, (b) applying directly onto said first main face 2 of the first functional element A, a second optical functional element B via a first main face 5 of said second optical functional element B, having a second refractive index, named hereafter ng, that is distinct from $n_A$, by injecting into said mold at least a second material B1, characterized in that, before performing the step (b), the process further comprises: (a1) drying the first optical functional element A, said drying step is adapted to or configured to obtain the first functional element A that has a moisture content lower than or equal to 500 PPM and, in particular, lower than or equal to 200 PPM.

Accordingly, the first optical functional element A and the second optical functional element B form the composite structure substrate of an optical article 1.

It is to be understood that by "injecting", it is referred to the known process of manufacturing composite ophthalmic articles by injection molding of a thermoplastic material.

According to the preferred embodiment described below, this first optical functional element A will correspond to the microstructured front part forming at least part of the convex front surface of a lens substrate and the second optical functional element B will correspond to the main rear part forming at least part of the concave rear surface of the lens substrate.

According to the invention, "a moisture content lower than or equal to 500 PPM" includes the following values and/or any intervals comprised between these values (limits included): 500; 490; 480; 470; 460; 450; 440; 430; 420; 410; 400; 300; 200; 100; 90; 80; 50; 40; 30; etc.

The Applicant showed that a particular drying pretreatment of the first optical functional element A, (i.e. the microstructured thin substrate part) prior to the applying step (b) (i.e.: injection step of the second material B1 generally by an injection-overmolding step) ensures the dimensional stability of the optical microstructures 4 of said first functional element A during said injection step (b) and in addition, during also the post-injection steps (for instance during the coating step(s) of one or more functional coatings, such as antireflective coating, hard-coating, etc.) so as to provide an optical article having consistent and accurate global average power (i.e.: diopter) for their microstructures. The claimed process enables thus to establish a process route to maintain excellent replication fidelity of the first functional element A, i.e.: microstructured thin upper part of the substrate.

As it will be shown in the experimental part below, the Applicant has surprisingly found that a significant decrease of the moisture level within the molded upper substrate part (i.e.: first functional element A) reduces dimensional changes of this piece during the overmolding and enables to control the consistency and the accuracy of the global average power of the microstructures of the obtained optical articles.

Indeed, the Applicant observed that that a pre-drying of the first functional element A/the thin microstructured upper substrate part helps in several ways:

- to reduce the level of moisture within the microstructured upper substrate part which prevents the material from relaxing due to free-volume effects (water molecules can situate themselves wherever there is excess free volume between chains);
- to enable the minimization of residual stresses through stress relaxation.

Step (a) of the claimed process will be first described hereafter.

In particular, this step consists in forming the first functional element A/the thin microstructured upper substrate part by injecting at least the first material A1 into a mold cavity of the injection molding device.

Typically, an injection molding device suitable for performing the process according to the invention comprises a mold having:

- a mold cavity for receiving a thermoplastic material (here the first material A1), the mold cavity includes a predetermined microstructured surface that is opposite to the desired pattern of the optical microstructures 4 of the first optical functional element A;
- a heat source in thermal connection with the mold; and
- a processor that may be configured to: control the heat source to set a surface temperature of the mold cavity to a heating temperature and to a cooling temperature;
- a thermoplastic injector configured to: inject the thermoplastic material into the mold cavity of the mold; and apply a compacting pressure at most 138 MPa to the thermoplastic material.

In particular, the mold includes a convex insert having at least one convex surface and a concave insert having at least one concave surface, where the predetermined microstructured surface of the mold cavity may be formed on the convex surface of the convex insert.

For instance, the injection molding device may correspond to the device FN4000 supplied by the company Nissei America Inc.

In general, this material A1 comprises one or more of the followings components (provided that ne is distinct from $n_A$): polycarbonate (PC), poly(methyl methacrylate) (PMMA), cyclic olefin copolymer (COC), cyclic olefin polymers (COP), cyclic block copolymer (CBC), polyamide (PA), polymethyl-pentene (PMP), polyethylene naphthalene (PEN), polyethylene terephthalate (PET), co-polyester, poly (n-methyl methacrylimide) (PMMI), styrene/methyl methacrylate copolymer (SMMA), thermoplastic polyurethane (TPU).

For instance, the polycarbonate (PC) may be selected from the following product: Iupilon® supplied by the company Mitsubishi Engineering-Plastics, Lexan® commercialized by the company SABIC, Panlite commercialized by the company Teijin or Durabio® biobased PC resin supplied by the company Mitsubishi Engineering-Plastics.

The poly(methyl methacrylate) (PMMA) may be selected from the following product: Plexiglas® from Röhm GmbH.

In particular, the first material A1 is often supplied in the form of pellets.

Generally, before performing step (a) of the current invention, these pellets are pre-dried by following a standardized drying process typically mentioned by the manufacturer of these pellets. For instance, the polycarbonate (PC) pellets may be pre-dried for a time period of 4 hours at a temperature of about 100-110 °C. The water content thus decreases from 0.14% by weight to less than 0.02% and typically less than 0.01% by weight.

Then, these pre-dried pellets of the first material A1 are heated typically above their softening temperature (Ts), which ranges generally from 200 °C to 300 °C, so as to obtain a molten first material A1. This molten first material A1 is injected onto a side of the injection molding cavity, in particular near or onto the convex surface of the convex insert described above comprising the predetermined microstructured surface (having a surface opposite to the desired pattern of the optical microstructures 4 of the lens substrate).

Once the mold cavity is injected with the first thermoplastic material A1, a compacting pressure is typically applied to the thermoplastic material, for example in the ranges of 5000-20000 psi. In general, the surface temperature of the mold cavity is raised to a heating temperature that is below the softening temperature of the first material A1 during the injection step. Then, the temperature of the mold cavity is lowered to a cooling temperature so as to cool the first material A1 and to obtain the first film A or the thin microstructured upper substrate part. The mold is then opened and the first functional element A is ejected.

The first functional element A comprises therefore at least a first main face 2 including the pattern of optical microstructures 4 and a second main face 3 that has a smooth surface and that is intended to correspond to the convex front surface of the lens substrate. This first functional element A has a first refractive index $n_A$.

This injection step (a) is then repeated for forming several microstructured first functional element A, i.e.: several thin microstructured upper substrate parts.

These technical aspects of the injection step (a) are well known to the skilled person and hence, will not be described in more detailed hereafters; the injection molding of a wafer or functional element comprising microstructures 4 is also known to the skilled person.

The optical microstructures 4 formed on the first main surface 2 of the first functional element A, i.e.: microlenses may correspond to a plurality of convex optical elements and/or may correspond to a plurality of concave elements. Each of the convex and concave optical elements, in some optical articles may have a diameter that is less than or equal to 2.0 millimeters (mm). For example, less than or equal to 2.0 mm includes the following values 2.0 mm, 1.5 mm, 1.0 mm, 0.5 mm, 0.1 mm, 80 μm, 60 μm, 40 μm, 20 μm, or smaller. In some optical articles, each of the convex and concave optical elements has a maximum height that is less than or equal to 0.1 mm, such as, for example, less than or equal to or between any two of 100 micrometers (μm), 90 μm, 80 μm, 70 μm, 60 μm, 50 μm, 40 μm, 30 μm, 20 μm, 10 μm, 5 μm, 1 μm, or smaller. Optionally, the maximum height is measured in a direction perpendicular to the first main surface of the first functional element A.

Concave and convex optical elements can be arranged in any suitable manner. For example, concave and convex optical elements can be defined within a first area that spans across all or part of the first surface of the first functional element A and, optionally, this first surface can have one or more second areas having no optical elements, e.g., at the centre and/or at the periphery of optical article. Typically, the different concave and convex optical elements are arrayed in concentric circles which represent rings, such as shown on FIG. 1 (11 Rings), these rings being span from the centre to the periphery of the first surface of the first functional element A.

Generally, the optical microstructures 4 can be either convex optical elements that protrude from the first main surface 2 of the first functional element A, or concave optical elements that recess into the first main surface 2 of the first functional element A.

Each of concave and convex optical elements can comprise any suitable optical element, e.g., for refracting light, such as, for example, a microlens, a Fresnel ring, and the like. As shown, each of concave and convex optical elements is a microlens and is adapted to or configured to be effective in slowing the progression of myopia.

The drying (a1) step of the first functional element A will be then described.

As previously mentioned, said drying step is adapted to or configured to obtain or provide a first functional element A (i.e.: thin microstructured upper substrate part) having a moisture content lower than or equal to 500 PPM and is, in particular, lower than or equal to 200 PPM.

For that purpose, the molded microstructured first functional element A/the thin molded microstructured upper substrate part is dried.

This drying step may be for instance be performed in an oven, in particular in a standard forced air convection oven. Typically, the molded first functional element A are placed onto a steel mesh in the oven to expose its two main sides (first 2 and second 3 surfaces) to the convective heat. Alternatively, the drying step can be performed in a vacuum oven.

In general, the drying step (a1) is performed at a temperature ($T_1$) below the glass transition temperature (Tg) of the first material A1, and preferably at a temperature ($T_1$) below or equal to the heat deflection temperature ($T_{HDT}$) of the first material A1.

In particular, the drying step (a1) is performed at a temperature ($T_1$) below at least 5 °C, preferably below at least 10 °C the glass transition temperature (Tg), and preferably is performed at a temperature ($T_1$) below at least 5 °C, preferably below at least 10 °C the heat deflection temperature ($T_{HDT}$) of the first material A1.

According to the invention "at least 5 °C" includes the following values and/or any intervals comprised between these values (limits included): 5; 6; 7; 8; 9; 10; 11; 12; 13; 14; 15; 16; 17; 18; 19; 20; 21; 22; 23; 24; 25; 26; 27; 28; 29; 30; 35; 40; 45; 50; 55; 60; 65; etc.

For instance, the materials that are suitable for forming the first film A have the following Tg and $T_{HDT}$ (see table 1):

TABLE 1

| Material | HDT (°C) | Tg (°C) |
|---|---|---|
| Polycarbonate (PC) | 125-130 | 145 |
| Polymethyl methacrylate(PMMA) | 100-105 | 125 |
| Cyclic-olefin copolymer (COC) | 100-105 | 125-135 |
| Polyamide (PA) | 110-120 | 140 |
| Polymethyl-pentene (PMP) | 80-90 | 115-120 |
| Polyethylene-naphthalene (PEN) | 95-100 | 120-125 |
| Polyethylene terephthalate (PET) | 60-65 | 78-85 |
| Copolyester (CPE) | 95-110 | 100-120 |

According to a characteristic of the invention, the drying step (a1) may be performed during a time lapse of at most 8 hours, preferably at most 6 hours, in particular at most 3 hours and typically at most 2 hours before the step (b) of the process according to the invention.

According to the invention "at most 8 hours" includes the following values and/or any intervals comprised between these values (limits included): 8 hours; 7 hours; 6 hours; 5 hours; 4 hours; 3 hours; 2 hours; 1.5 hours, 1 hour; 45 min; 30 min; 20 min, 15 min, 10 min, 5 min, such as immediately after performing step (a) and/or just prior step (b) of the process according to the invention.

According to the invention "the drying step (a1) may be performed during a time lapse of at most X hours before step Y" implies that the drying step is performed so as to end at most X hours before step Y.

Generally, the drying step (a1) is performed during a time period equal to or lower than 15 hours, preferably equal to or lower than 13 hours and is typically ranges from 1 hour to 15 hours.

According to the invention "a time period equal to or lower than 15 hours" includes the following values and and/or any intervals comprised between these values (limits included): 15 hours; 14 hours; 13 hours; 12 hours; 11 hours; 10 hours; 9 hours; 8 hours; 7 hours; 6 hours; 5 hours; 4 hours; 3 hours; 2 hours; 1 hour; 45 minutes or 30 minutes.

For instance, the drying step may be performed during 8 to 15 hours at a temperature ranges from 60 to 90 °C, such as 82 °C for 12 hours, or during 1 to 5 hours at a temperature ranges from 90 to 140 °C, such as 120 °C for 3 hours.

Generally, the process comprises only one drying step (a1). Alternatively, the process comprises several drying steps (a1). According to this embodiment, the drying step (a1) may comprise at least a first drying step (a11) performed after step (a) and a second drying step (a12) performed before step (b).

Hence, the following characteristics enable to decrease the moisture content of the molded first functional element A/thin microstructured upper part of the lens substrate.

Hence, thanks to its characteristics and especially to the specific drying step (1), the process according to the invention enables to achieve a first functional element A/thin upper substrate part having a dimensional stability even after being processed by the adjunction of the second functional element B by injection molding. Indeed, the process according to the invention allow unexpectedly to decrease the amount of built-in residual stress within the thin molded first functional element A/thin microstructured upper part of the lens substrate, that leads to an increase of the overall optical properties of the lens substrate.

Without to be bound by any theory, it would appear that a variation of moisture content in a molded microstructured substrate may lead to a change of the optical microstructure shape, especially during the further step of overmolding (b) and in particular to a decrease of the global average power measured for the microstructures 4 of the obtained optical substrate. In particular, some materials are very sensitive to ambient moisture, such as the polycarbonate. Polycarbonate is a thermoplastic material which is inherently hygroscopic in nature, and as its mechanical property behavior, especially during the overmolding step, could be highly dependent on its moisture content (MC).

The step (b) of the process according to the invention will be described hereafter.

The step (b) of the process according to the invention consists in applying directly onto said first main microstructured face 2 of the first functional element A, a second functional element B having a second refractive index, named hereafter $n_B$, that is distinct from $n_A$, by injecting into the mold of the injection molding device at least a second material B1.

In general, as for the first material A1, the second material B1 may also comprise one or more of the followings components provided that ne is distinct from $n_A$: polycarbonate (PC), poly(methyl methacrylate) (PMMA), cyclic olefin copolymer (COC), cyclic olefin polymers (COP), cyclic block copolymer (CBC), polyamide (PA), polymethyl-pentene (PMP), polyethylene naphthalene (PEN), polyethylene terephthalate (PET), co-polyester, poly(n-methyl methacrylimide) (PMMI), styrene/methyl methacrylate copolymer (SMMA), thermoplastic polyurethane (TPU). These second material B1 may also be supplied into the formed of pellets that are commonly pre-dried before performing step (b).

According to the invention, the second material B1 is distinct from the first material A1, or if of the same material, it comprises elements or additional compounds giving it different optical properties than first material A1.

Typically, the difference between the first refractive index $n_A$ and the second refractive index ne is equal to or higher than 0.01, preferably equal to or higher than 0.04 and typically equal to or higher than 0.05.

The difference in refractive index between the first optical functional element A and the second optical functional element B is such that the microstructures 4 present at the interface between the two elements have an optical power dependent on the geometry of the microstructures 4 and both refractive index. According to the invention, this step (b) is preferably performed by injection overmolding.

The microstructured first optical functional element A, especially its second smooth surface 3, is placed onto the concave insert having a concave surface into the molding cavity of the mold, such as described above for the step (a) of the process according to the invention. Therefore, the first surface 2 of the first functional element A comprising the optical microstructures 4 is not in contact with any inserts.

Then, the second material B1 and especially the pre-dried pellets of material B1 are heated typically above their softening temperature (Ts), which ranges generally from 200 to 300 °C so as to obtain a molten second material B1. This molten second material B1 is injected and a compacting pressure is typically applied to the molten second material B1. The molten second material B1 is injected directly onto the first surface 2 of the first optical functional element A comprising the optical microstructures 4, thereby creating an instant fusion between the first optical functional element A and the heated thermoplastic material. Hence, during this step, the second material B1 both encapsulates these optical microstructures 4 and coats the first surface 2 of the first optical functional element A, generally the whole surface of the first optical functional element A, forming thus a lens substrate having a composite structure.

Then, the temperature of the mold cavity is lowered to a cooling temperature so as to cool the second material B1 and the mold is then opened and the obtained substrate is ejected.

The obtained substrate comprises therefore a composite structure: the first optical functional element A and the second optical functional element B, wherein the second smooth surface 3 of the first optical functional element A represents the convex front surface of the lens substrate and wherein the second smooth surface 6 of the second optical functional element B represents the concave rear surface of the lens substrate, i.e.: the optical microstructures 4 are embedded into the second optical functional element B.

The process according to the invention is then repeated for forming several optical articles having the same or similar corrective properties from the first optical functional element A and the second optical functional element B (high degree of replicability of the process according to the invention).

This injection overmolding step (b) is well known from the skilled person and hence, will not be described in more detailed hereafter.

The process according to the invention may comprise the following step after step (b):

(c) coating on the second main face 3 of the optical functional element A and/or on a second main face 6 of the second optical functional element B, one or more of the followings coatings: an impact-resistant primer layer, an anti-abrasion and/or anti-scratch coating, a hydrophobic coating, a hydrophilic coating and an antireflective coating.

Generally, the second main surface 3 of the first optical functional element A and the second main surface 6 of the second optical functional element B may be coated with additional functional coatings that are well known from the skilled person and will be therefore shortly described hereafter.

The antireflective coating of the invention is well known in the art and may correspond to the ones described in the PCT patent application WO 2012/076714. It commonly comprises a stack of at least two layers having a refractive index higher than or equal 1.55, defined as "HI layer" and at least two layers having a refractive index lower than 1.55, defined as LI layer and has a mean light reflection factor in the visible region $R_v$ (measured according to ISO 13666:

1998 Standard) lower than or equal to 2.5%, preferably 2.0% for at least an angle of incidence equal to or lower than 15°. The refractive indexes referred to in the present application are expressed at 25 °C at a wavelength of 550 nm.

The anti-abrasion and/or scratch-resistant coatings are preferably hard coatings based on poly(meth)acrylates or silanes, generally comprising one or more mineral fillers intended to increase the hardness and/or the refractive index of the coating once cured. Suitable coatings, that are recommended for the present invention include coatings based on epoxysilane hydrolyzates such as those described in the patents FR 2 702 486 (EP 0 614 957), U.S. Pat. Nos. 4,211,823 and 5,015,523.

Prior to depositing the abrasion-resistant coating and/or the scratch-resistant coating, it is possible to apply onto the substrate a primer coating to improve the impact resistance and/or the adhesion of the subsequent layers in the final product. This coating may be any impact-resistant primer layer traditionally used for articles in a polymer material, such as ophthalmic lenses.

Preferred primer compositions are compositions based on polyurethanes and compositions based on latexes, especially polyurethane type latexes optionally containing polyester units.

The optical lens according to the invention may also comprise coatings formed on the antireflective coating and capable of modifying the surface properties thereof, such as hydrophobic and/or oleophobic coatings (antifouling top-coat). Instead of the hydrophobic coating, a hydrophilic coating may be used which provides antifog properties, or an antifog precursor coating which provides antifog properties when associated with a surfactant. Examples of such antifog precursor coatings are described in the patent application WO 2011/080472.

According to a characteristic of the invention, an optical article obtained according to the process of the invention is coated successively on the second face 6 of the second optical functional element B (i.e.: corresponding generally to the rear concave face of the optical article thus formed) with an impact-resistant primer layer, an anti-abrasion and scratch-resistant layer, an antireflective coating and with a hydrophobic and/or oleophobic coating, or with a hydrophilic coating which provides antifog properties, or an antifog precursor coating.

According to another characteristic of the invention, an optical article obtained according to the process of the invention is coated successively on the second face 3 of the first optical functional element A (i.e.: corresponding generally to the front convex face of the optical article thus formed) with an impact-resistant primer layer, an abrasion-resistant layer and/or a scratch-resistant layer, an antireflective coating according to the invention, and with a hydrophobic and/or oleophobic coating.

The optical article obtained according to the process according to the invention is preferably an optical lens, preferably an ophthalmic lens, in particular a spectacle lens, or a blank for spectacle lens.

C) Optical Article According to the Invention

The present invention also relates to an optical article 1 comprising a substrate with a front main face and with a rear main face, said substrate comprises at least:

- a first optical functional element A having a first refractive index, named hereafter $n_A$, the first optical functional element A having at least a first main face 2 and a second main face 3, said first main face 2 including a pattern of optical microstructures 4,
- a second optical functional element B having a second refractive index, named hereafter ng, that is distinct from $n_A$, the second optical functional element B having at least a first main face 5 and a second main face 6, said first main face 5 of the second optical functional element B being in direct contact with the first face 2 including a pattern of optical microstructures 4 of the first optical functional element A, characterized in that the first optical functional element A has a moisture content lower than or equal to 500 PPM, preferably lower than or equal to 200 PPM.

The Applicant has indeed surprisingly discovered that a decrease of the moisture content of the first optical functional element A (corresponding generally to the upper thin microstructured part of the substrate such as mentioned above) enables to obtain a final optical article having an improved global average power (diopter) measured for their microstructures 4 as compared to the optical articles of the prior art (i.e.: obtained according to the process of the prior art). In particular, the optical article according to the invention has a first microstructured optical functional element A/a thin microstructured upper part, wherein the optical microstructures 4 are uniform and accurate between two different optical articles. As explained above, it is a real challenge to design new optical articles having such characteristic.

In particular, the difference between the first refractive index $n_A$ and the second refractive index ne is equal to or higher than 0.01, preferably equal to or higher than 0.04 and typically equal to or higher than 0.05.

In general, one of at least said rear main face and front main face is coated with one or more of the followings coatings: an impact-resistant primer layer, an anti-abrasion and/or anti-scratch coating, a hydrophobic coating, a hydrophilic coating and an antireflective coating.

Preferably, the optical article is an ophthalmic lens, in particular a spectacle lens.

The optical article can have any suitable shape, for instance, the optical article can be spherical, toric, or aspherical.

Of course, the various characteristics/embodiments/definitions described above for the process according to the invention also apply here to the optical article according to the invention and will not be repeated below.

D) Use According to the Invention

Finally, the current invention also deals with the use of the optical article described above or obtained according to the above-mentioned method, for myopia control and/or prevention.

EXAMPLES

A) General Procedures

Different optical lenses comprising a thin molded microstructured upper part (i.e.: first optical functional element A) and a main lower part (i.e.: second optical functional element B) have been manufactured according to the process of the invention so as to:

- measure the moisture content of this thin molded microstructured upper part of the lens substrate (Example 1) and measure the global average power of the microstructures located in different rings R01 to R11 of these optical lenses (Examples 2 and 3).

The person skilled in the art understand that these steps of measuring the moisture and/or average power of the lens is not a necessary step for applying the invention, but are used here as tools to demonstrate the performance of the process of the present disclosure.

The thin microstructured upper part A corresponds to the convex front face of the lenses, whereas the main lower part B corresponds to the concave rear face of the lenses.

The formed optical lenses are spheric with a diameter of 76 mm, and a nominal center thickness of 1.1 mm.

Starting Materials

The starting materials A1 and/or B1 for forming respectively the thin molded microstructured upper substrate part and/or the main lower substrate part are as follows:

TABLE 2

| Material A1/ Material B1 | Composition | Manufacturer |
|---|---|---|
| Iupilon ® | polycarbonate | Mitsubishi Engineering-Plastics |
| Lexan ® | polycarbonate | Americas SABIC |
| Durabio ® biobased PC resin D7340R | Ali-cyclic polycarbonate | Mitsubishi Engineering-Plastics |
| Plexiglas ® | poly (methyl methacrylate) PMMA | Röhm GmbH |

The Used Instruments

The instruments used for manufacturing the exemplified optical lenses are as follows:

TABLE 3

| Instruments | Manufacturer | Used parameters |
|---|---|---|
| Molding device for optical functional element A/upper part | Nissei America Inc | Tmelt = 315 °C, Pm = 15 kpsi, Inj-Vel = 60 mm/s, Tmold = 130 °C |
| Molding device for optical functional element B/lower part | Nissei America Inc | Tmelt = 240 °C, Pm = 12 kpsi, Inj-Vel = 6 mm/s, Tmold = 105 °C |
| Standard forced air convection oven | Yamato | 80 °C/12 hours (example 2) 120 °C/3 hours (example 3) |
| Moisture content | Arizona Computrac Vapor Pro | Tmelt = 120-200 °C |
| Global average power | Jarvis Clear-Reader | Transmission & reflection mode |

In particular, the molding device for forming the thin microstructured upper substrate part (optical functional element A) has a convex insert having a convex surface that is configured to provide injection molded 1.1 mm upper substrate having internal optical microstructures (i.e.: microlenses) about 1 μm in height and 1.12 mm in diameter. In addition, as shown on FIG. 1 *a*), these optical microstructures are arrayed in concentric circles which represent 11 rings i.e.: on a ray of the thin microstructured upper substrate part, such as shown on FIG. 1*b* (horizontal axis X-X), 11 rings are positioned, named hereafter R01 to R11.

Test Procedures

Prior step: material A1 in the form of pellets is pre-dried following the manufacturer's recommendations.

Step (a): the mold is closed and a material A1 is injected into the cavity of the mold using a defined injection molding process. After the cavity has been filled with the material A1, the material A1 is cooled to a cooling temperature which range from about 100 °C to about 130 °C. (this temperature depends on the composition of the material A1), the mold is opened, and the article is ejected. This step can be repeated, using the same molds, to produce several first optical functional elements A, i.e.: several thin microstructured upper substrate parts.

Step (a1): the thin microstructured upper substrate parts obtained in step (a) is then dried according to different experimental conditions. During this step, the thin microstructured upper substrate parts are placed onto a steel mesh to expose both sides of the substrates to the convective heat. At the end of this step, the moisture content of the thin microstructured upper parts substrates according to the invention is equal to or less than 200 PPM.

Alternatively, some thin microstructured upper substrate parts have not been dried as comparative examples.

Step (b): material B1 in the form of pellets is pre-dried following the manufacturer's recommendation. Then, this pre-dried material B1 is overmolded using a defined molding process onto the dried microstructured upper parts substrates. In particular, the material B1 is injected onto the face of the dried microstructured upper substrate parts comprising the optical microstructures. This injection overmolding is performed in a time lapse of at most 8 hours after the drying step (a1). The composite structure substrate is later ejected. This step is then repeated, using the same molds, but with other first optical functional elements A, to produce several composite structure substrates. The difference in refractive index between material A1 and material B1 is such that the microstructures present at the interface between the two materials have an optical power dependent on the geometry of the microstructures and both refractive index.

The composite structure substrates are let sit for at least 24 hours prior the optical performance measurements.

The composite structure substrates correspond to 1.1 mm plano microstructured substrates for a 3.25 base front curve SF lens product.

B) Example 1

The moisture contents of different thin microstructured upper substrate parts (first optical functional element A) made from the following materials A have been measured as function of the drying time in the oven (at 80 °C or 100 °C): Plexiglas (PMMA), lupilon (PC), and Durabio (Ali-cyclic PC).

For this experiment, the thin microstructured upper parts substrates have been analyzed after being left in regular room environment for a few days.

Right before the moisture content analysis, the samples are cut from the center part where the optical microstructures are located.

The moisture contents (ppm) are as follows for a drying step at 80 °C:

TABLE 4

| | Drying time (hours) | | | | | | | |
|---|---|---|---|---|---|---|---|---|
| | 0 | 1 | 2 | 3 | 4 | 5 | 6 | 7 |
| Plexiglas (PMMA) | 235 | 136 | 135 | 90 | NA | NA | NA | NA |
| Iupilon (PC) | 1300 | 520 | 390 | 65 | NA | NA | NA | NA |
| Durabio (PC) | 4800 | 3300 | 1450 | NA | 1000 | NA | NA | 730 |

The moisture contents (ppm) are as follows for a drying step at 100 °C:

TABLE 5

| | Drying time (hours) | | | | | | | |
|---|---|---|---|---|---|---|---|---|
| | 0 | 1 | 2 | 3 | 4 | 5 | 6 | 7 |
| Plexiglas (PMMA) | 210 | 95 | 52 | NA | NA | NA | NA | NA |
| Iupilon (PC) | 1350 | 550 | 320 | 60 | NA | NA | NA | NA |
| Durabio (PC) | 4800 | 2600 | 1950 | NA | 720 | NA | NA | 230 |

These tables show that the drying step (a1) according to the invention enables to decrease for all the tested thin microstructured upper substrate parts their moisture content. In particular, these tables show that the drying time decreases when the used temperature is close the heat deflection temperature of the material A1. Especially, it is preferable to use a drying temperature above 100 °C for the material A1 made of polycarbonate, such as 120 °C and a temperature below 100 °C for the material A1 made of PMMA, such as 80 °C.

C) Example 2

The global average power for the microstructures of different optical lenses obtained according to the process of the invention (drying step of the microstructured upper substrate parts) and according to the prior art (no drying step of the microstructured upper substrate parts) was measured.

The followings composition structures and drying conditions have been tested:

TABLE 6

| Examples | Upper substrate part (Film A) | Lower substrate part (Film B) |
|---|---|---|
| Ex. 1 | Iupilon dried at 120 °C during 3 hours | Plexiglas (PMMA) |
| Comp. 1 | Iupilon without any drying step | Plexiglas (PMMA) |
| Ex. 2 | Iupilon dried at 120 °C during 3 hours | Durabio (PC) |
| Comp. 2 | Iupilon without any drying step | Durabio (PC) |
| Ex. 3 | Durabio<br>Dried at 80 °C during 12 hours | Iupilon (PC) |
| Comp. 3 | Durabio<br>No drying step | Iupilon (PC) |

The microstructured upper substrate parts obtained according to the process of the invention have a moisture amount of 105 PPM for Ex.1 and Ex.2 or of 112 PPM for Ex.3, whereas the comparative microstructured upper substrate parts obtained according to the process of the prior art have a moisture amount of greater than or equal to 900 PPM (Comp.1 to Comp.3).

The following results are obtained in the different rings R1 to R11 of the microstructured pattern:

TABLE 7

| | Average global Power Rings<br>Rings | | | | | | | | | | |
|---|---|---|---|---|---|---|---|---|---|---|---|
| Ex. | 1 | 2 | 3 | 4 | 5 | 6 | 7 | 8 | 9 | 10 | 11 |
| Ex. 1 | 4.60 | 4.61 | 4.58 | 4.50 | 4.36 | 4.18 | 3.96 | 3.66 | 3.31 | 2.89 | 2.41 |
| Comp. 1 | 4.45 | 4.47 | 4.43 | 4.35 | 4.21 | 4.05 | 3.82 | 3.52 | 3.21 | 2.81 | 2.35 |
| Ex. 2 | 5.09 | 5.12 | 5.08 | 5.01 | 4.86 | 4.66 | 4.43 | 4.10 | 3.72 | 3.27 | 2.75 |
| Comp. 2 | 4.94 | 4.97 | 4.93 | 4.86 | 4.71 | 4.51 | 4.29 | 3.96 | 3.62 | 3.19 | 2.70 |
| Ex. 3 | 3.47 | 3.61 | 3.60 | 3.56 | 3.46 | 3.33 | 3.17 | 2.95 | 2.65 | 2.31 | 1.93 |
| Comp. 3 | 3.30 | 3.40 | 3.36 | 3.33 | 3.26 | 3.14 | 2.99 | 2.75 | 2.55 | 2.20 | 1.86 |

This table 7 shows that the drying step of the upper substrate parts (optical functional element A) enables to increase the global average power of the microlenses according to the invention (Ex.1 to 3) as compared to the comparative lenses obtained according to the prior art process (i.e.: without the drying step).

It seems therefore to the inventors, that, without being bond by theory, the drying step according to the invention has a twofold effect:

First of all, drying reduces and stabilizes the moisture content (MC) in a wafer. The inventors estimates that presence of moisture in a wafer that is subjected to a thermomechanical process such as injection molding can theoretically lead to rapid non-uniform volumetric shrinkage caused by moisture induced free volume effects. The process of the disclosure which enables a control of the moisture content reduces the excess free volume and hence prevents some uncontrolled change of the radius of curvatures of the microlenses on the surface of the upper substrate part and thus enables the increase in average global power in the final article.

Secondly, the drying step also acts as an annealing step that light relieves some residual stresses in a wafer resulting from the injection molding process that formed the upper substrate part. The reduction of such residual stresses before overmolding the lower substrate part might also be a factor that minimizes the deformation of the resulting lens, thus enabling a better power accuracy and consistency.

On the contrary, for the comparative examples, it seems that the relatively high level of moisture content (i.e.: 900

PPM-no drying step) could impart dimensional changes of the microstructured upper substrate parts during the injection overmolding and therefore impact the global average power of the microstructures of the comparative optical lenses (the global average power of the microstructures of the comparative lenses is well below the ones according to the invention, see Ex. 1 versus Comp.1, or Ex.2 versus Comp.2 or Ex.3 versus Comp.3).

D) Example 3

The global average power of the microlenses present on different optical lenses obtained according to the process of the invention (drying step of the of the microstructured upper substrate part) and according to the prior art (no drying step of the microstructured upper substrate part) was measured.

The followings composition structures with the indicating drying conditions have been tested:

TABLE 6

| | Examples | Upper substrate part (Optical functional element A) | Lower substrate part (Optical functional element B) |
|---|---|---|---|
| Study 1 | Ex. 4 (30 lenses) | Iupilon (PC) Dried at 82 °C during 12 hours | Plexiglas (PMMA) |
| | Comp. 4 (30 lenses) | Iupilon (PC) No dried | Plexiglas (PMMA) |
| Study 2 | Ex.5 (25 lenses) | Lexan (PC) Dried at 120 °C during 3 hours | Plexiglas (PMMA) |
| | Comp. 5 (25 lenses) | Lexan (PC) No dried | Plexiglas (PMMA) |

The microstructured upper substrate parts obtained according to the process of the invention have a moisture amount of 105 PPM for Ex.4 or of 112 PPM for Ex.5, whereas the comparative microstructured upper substrate parts obtained according to the process of the prior art have a moisture amount of 900 PPM (Comp.4 to Comp.5).

Figure 3:
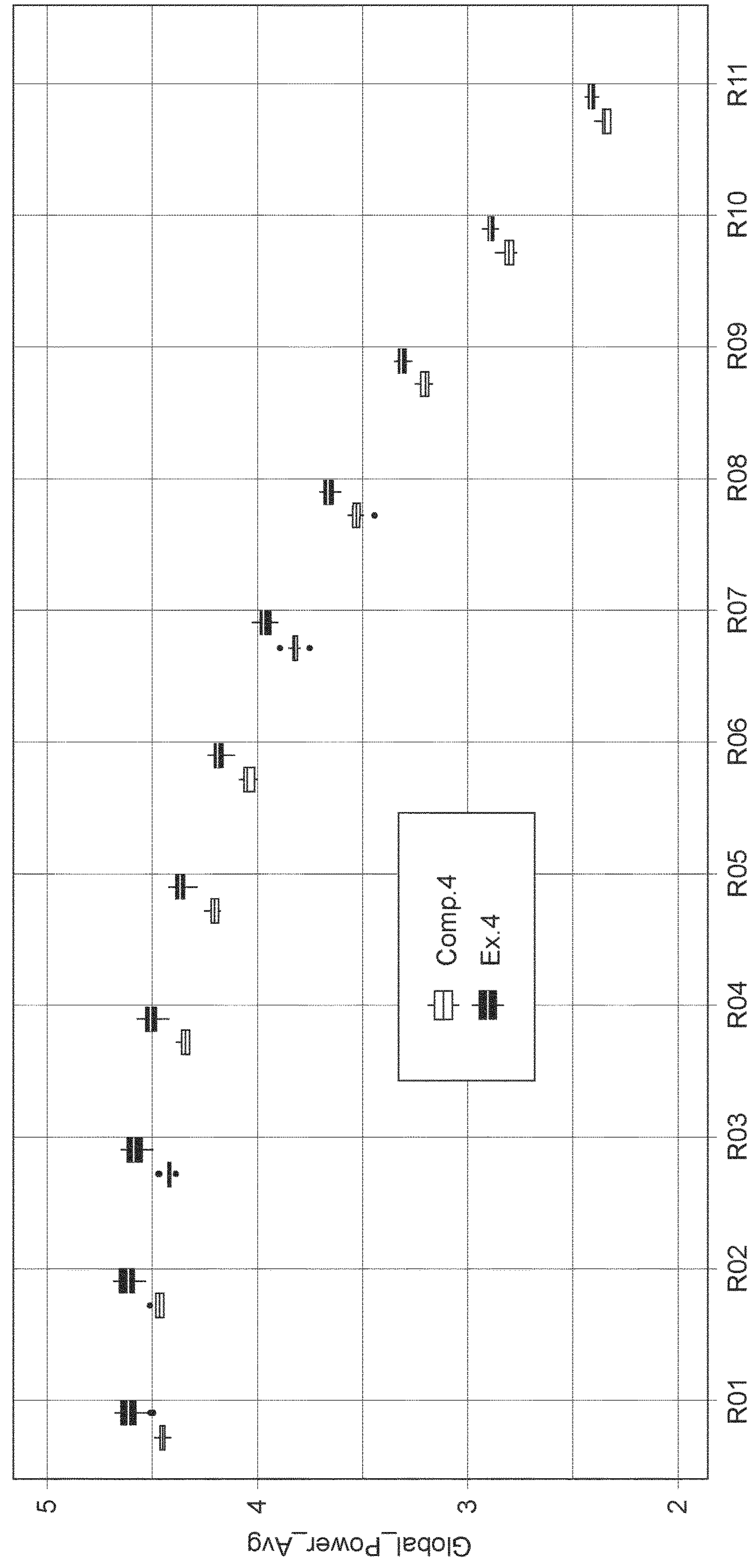
FIG. 3 shows the global average power of the optical microstructures measured with the Jarvis Clear-Reader for optical articles (study 1) obtained according to the process of the invention (with a drying step at 82 °C during 12 hours) or obtained according to the prior art process (without drying step) as function of the position of the optical microstructures arrayed in concentric rings (R01 to R11) (i.e.: the global average power has been measured for the set of microstructures located in the same ring and this, for all the different rings)
Figure 4:
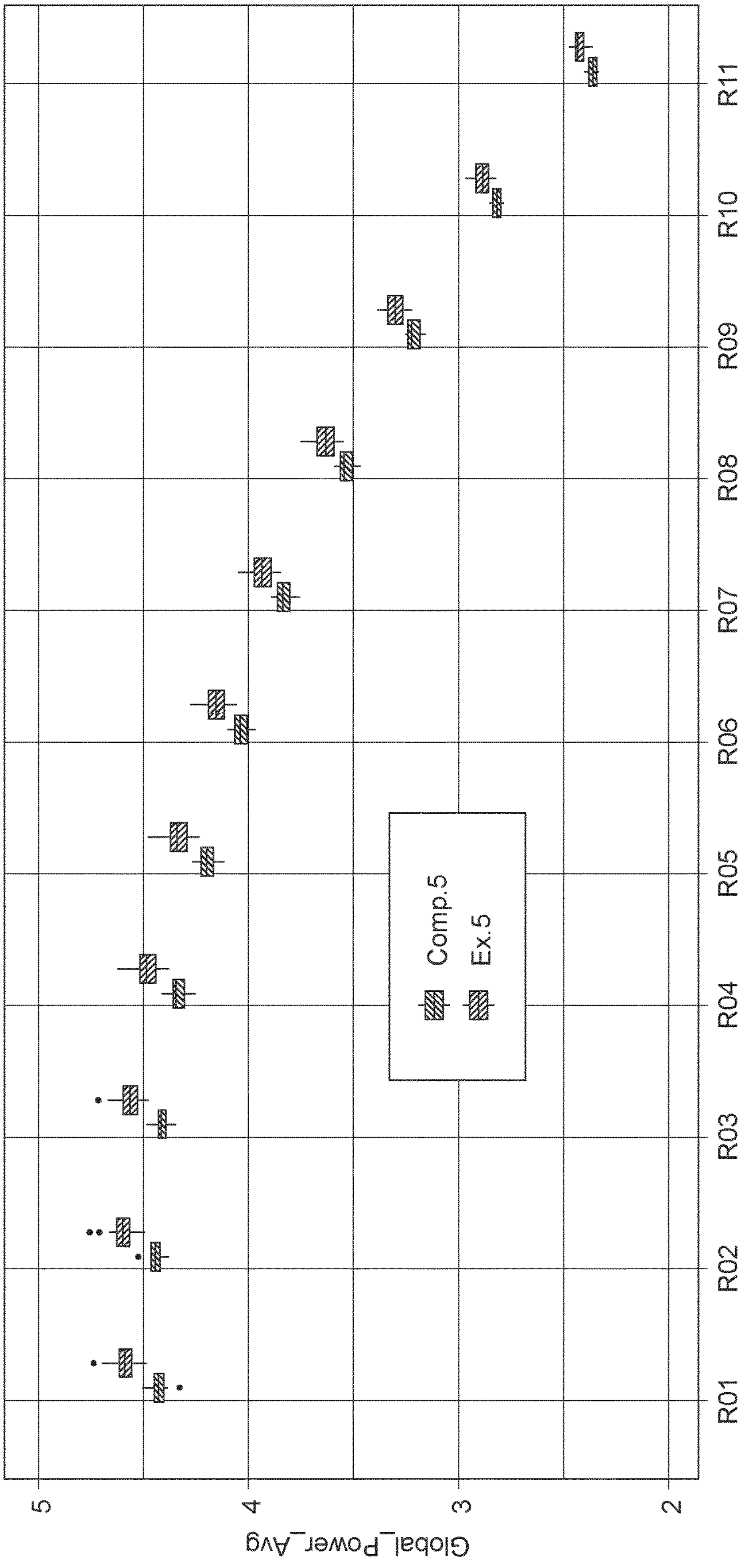
FIG. 4 shows the global average power of the optical microstructures measured with the Jarvis Clear-Reader for optical articles (study 2) obtained according to the process of the invention (with a drying step at 120 °C during 3 hours) or obtained according to the prior art process (without drying step) as function of the position of the optical microstructures arrayed in concentric rings (R01 to R11) (i.e.: the global average power has been measured for the set microstructures located in the same ring and this, for all the different rings).

The results of the study 1 is shown on FIG. 3, whereas the results of study 2 is shown on FIG. 4.

In particular, these FIGS. 3 and 4 represent the global average power of the microlenses present on the lens substrates obtained according to the process of the invention (with a drying step) or obtained according to the process of the prior art (without drying step) measured in different rings R1 to R11 of the microstructured pattern (shown on FIG. 1).

Especially, 60 lenses have been tested for the study 1 and 50 lenses for the study 2. Hence, the rectangles on these FIGS. 3 and 4 (horizontal line, vertical line and their thicknesses) correspond to the variation of the global power for the different studied lenses.

These studies show that an improvement of the global average power was observed between dried versus non-dried microstructured upper substrates (0.25D delta for study 1, and ~0.20D for study 2 respectively) and therefore show that the water/moisture content within the microstructured upper substrate part before injection overmolding as an influence on the optical properties of the obtained lens (final substrate).

The invention claimed is:

1. A process for manufacturing an optical article comprising at least the following successive steps:

(a) producing a first optical functional element A having a first refractive index, named hereafter $n_A$, by injecting in a mold of an injection molding device at least a first material A1, the first optical functional element A having at least a first main face and a second main face, said first main face including a pattern of optical microstructures; and (b) applying directly onto said first main face of the first optical functional element A, a second optical functional element B via a first main face of said second optical functional element, having a second refractive index, named hereafter $n_B$, that is distinct from $n_A$, by injecting into said mold at least a second material B1, wherein, before performing step (b), the process further comprises (a1) drying the first optical functional element A, said drying step adapted to or configured to obtain a first optical functional element A having a moisture content lower than or equal to 200 PPM.

2. The process of claim 1, wherein drying step (a1) is adapted to or configured to obtain a first optical functional element A having a moisture content lower than or equal to 100 PPM.

3. The process of claim 1, wherein drying step (a1) is performed during a time lapse of at most 8 hours before step (b).

4. The process of claim 3, wherein drying step (a1) is performed during a time lapse of at most 6 hours before step (b).

5. The process of claim 1, wherein drying step (a1) comprises at least a first drying step (a11) performed after step (a) and a second drying step (a12) performed before step (b).

6. The process of claim 1, wherein drying step (a1) is performed at a temperature ($T_1$) below the glass transition temperature (Tg) of the first material A1.

7. The process of claim 1, wherein drying step (a1) is performed at a temperature ($T_1$) below or equal to the heat deflection temperature ($T_{HDT}$) of the first material A1.

8. The process of claim 7, wherein drying step (a1) is performed at a temperature ($T_1$) below at least 5 °C of the heat deflection temperature ($T_{HDT}$) of the first material A1.

9. The process of claim 8, wherein drying step (a1) is performed at a temperature ($T_1$) below at least 10 °C of the heat deflection temperature ($T_{HDT}$) of the first material A1.

10. The process of claim 1, wherein drying step (a1) is performed during a time period equal to or lower than 15 hours.

11. The process of claim 10, wherein drying step (a1) is performed during a time period equal to or lower than 13 hours.

12. The process of claim 1, wherein the difference between the first refractive index $n_A$ and the second refractive index $n_B$ is equal to or higher than 0.01.

13. The process of claim 12, wherein the difference between the first refractive index $n_A$ and the second refractive index $n_B$ is equal to or higher than 0.04.

14. The process of claim 1, wherein the first material A1 and the second material B1 comprises one or more of the followings components provided that $n_B$ is distinct from $n_A$: polycarbonate (PC), poly(methyl methacrylate) (PMMA), cyclic olefin copolymer (COC), cyclic olefin polymers (COP), cyclic block copolymer (CBC), polyamide (PA), polymethyl-pentene (PMP), polyethylene naphthalene (PEN), polyethylene terephthalate (PET), co-polyester, poly (n-methyl methacrylimide) (PMMI), styrene/methyl methacrylate copolymer (SMMA), thermoplastic polyurethane (TPU).

15. The process of claim 1, further comprising the following step after step (b):

(c) coating on the second main face of the optical functional element A and/or on a second main face of the second optical functional element B, one or more of the following coatings: an impact-resistant primer layer, an anti-abrasion and/or anti-scratch coating, a hydrophobic coating, a hydrophilic coating and an antireflective coating.

16. The process of claim 1, wherein the optical article is an ophthalmic lens.

17. An optical article comprising a substrate with a front main face and with a rear main face, said substrate comprising at least:

a first optical functional element A having a first refractive index, named hereafter $n_A$, the first optical functional element A having at least a first main face and a second main face, said first main face including a pattern of optical microstructures; and a second optical functional element B having a second refractive index, named hereafter $n_B$, that is distinct from $n_A$, the second optical functional element B having at least a first main face and a second main face, said first main face of the second optical functional element B being in direct contact with the first face including a pattern of optical microstructures of the first optical functional element A, wherein the first optical functional element A has a moisture content lower than or equal to 200 PPM.

18. The optical article of claim 17, wherein the first optical functional element A has a moisture content lower than or equal to 100 PPM.

19. The optical article of claim 17, wherein the difference between the first refractive index $n_A$ and the second refractive index $n_B$ is equal to or higher than 0.01.

20. The optical article of claim 19, wherein the difference between the first refractive index $n_A$ and the second refractive index $n_B$ is equal to or higher than 0.04.

21. The optical article of claim 17, wherein one of at least said rear main face and front main face is coated with one or more of the followings coatings: an impact-resistant primer layer, an anti-abrasion and/or anti-scratch coating, a hydrophobic coating, a hydrophilic coating and an antireflective coating.

22. The optical article of claim 17 further defined as an ophthalmic lens.

* * * * *